US007007058B1

(12) United States Patent
Kotlov

(10) Patent No.: US 7,007,058 B1
(45) Date of Patent: Feb. 28, 2006

(54) METHODS AND APPARATUS FOR BINARY DIVISION USING LOOK-UP TABLE

(75) Inventor: Valeri Kotlov, Woburn, MA (US)

(73) Assignee: Mercury Computer Systems, Inc., Chelmsford, MA (US)

( * ) Notice: Subject to any disclaimer, the term of this patent is extended or adjusted under 35 U.S.C. 154(b) by 487 days.

(21) Appl. No.: 10/190,892

(22) Filed: Jul. 8, 2002

Related U.S. Application Data

(60) Provisional application No. 60/303,559, filed on Jul. 6, 2001.

(51) Int. Cl.
*G06F 7/50* (2006.01)

(52) U.S. Cl. ...................................................... 708/654

(58) Field of Classification Search ................. 708/654
See application file for complete search history.

(56) References Cited

U.S. PATENT DOCUMENTS

| | | | | |
|---|---|---|---|---|
| 4,794,521 A | | 12/1988 | Ziegler et al. | 364/200 |
| 5,307,303 A | * | 4/1994 | Briggs et al. | 708/654 |
| 5,309,385 A | | 5/1994 | Okamoto | 365/761 |
| 5,442,581 A | | 8/1995 | Poland | 374/764 |
| 5,537,338 A | | 7/1996 | Coelho | 364/514.12 |
| 5,539,682 A | * | 7/1996 | Jain et al. | 708/200 |
| 5,600,846 A | | 2/1997 | Gallup et al. | 395/800 |
| 5,818,744 A | * | 10/1998 | Miller et al. | 708/654 |
| 5,825,680 A | | 10/1998 | Wheeler et al. | 364/761 |
| 5,831,885 A | | 11/1998 | Mennemeier | 364/761 |
| 5,937,202 A | | 8/1999 | Crosetto | 395/800.19 |
| 6,014,684 A | | 1/2000 | Hoffman | 708/620 |
| 6,081,824 A | | 6/2000 | Julier et al. | 708/653 |
| 6,094,415 A | | 7/2000 | Turner | 370/203 |
| 6,115,812 A | | 9/2000 | Abdallah et al. | 712/300 |
| 6,173,305 B1 | | 1/2001 | Poland | 708/650 |
| 6,202,077 B1 | | 3/2001 | Smith | 708/523 |
| 6,211,971 B1 | | 4/2001 | Specht | 358/1.9 |
| 6,330,000 B1 | * | 12/2001 | Fenney et al. | 345/586 |
| 6,446,106 B1 | * | 9/2002 | Peterson | 708/654 |
| 6,769,006 B1 | * | 7/2004 | Krouglov et al. | 708/502 |
| 2003/0074384 A1 | * | 4/2003 | Parviainen | 708/654 |

FOREIGN PATENT DOCUMENTS

| | | |
|---|---|---|
| EP | 0 987 898 A1 | 3/2000 |
| WO | WO 00/22512 | 4/2000 |

* cited by examiner

*Primary Examiner*—D. H. Malzahn
(74) *Attorney, Agent, or Firm*—David J. Powsner; Nutter, McClennen & Fish, LLP

(57) ABSTRACT

Improved methods of operating a digital data processor to perform binary division include estimating reciprocals of at least selected divisors based on value accessed from a look-up table. For divisors in a first numerical range, the estimation can be based on a value stored in a first look-up table at an index defined by the divisor. For divisors in a second numerical range, the estimation can be based on an index that is a bitwise-shifted function of the divisor. The methods can be applied to scalar and vector binary division.

10 Claims, 4 Drawing Sheets

| $b_m$ | $\hat{b}_m^{-1}$ |
|---|---|
| 0 | 0 |
| 1 | 255 |
| 2 | 127 |
| 3 | 85 |
| 4 | 63 |
| 5 | 51 |
| 6 | 42 |
| 7 | 36 |
| 8 | 31 |
| 9 | 28 |
| 10 | 25 |
| 11 | 23 |
| 12 | 21 |
| 13 | 19 |
| 14 | 18 |
| 15 | 17 |
| 16 | 15 |
| 17 | 15 |
| 18 | 14 |
| 19 | 13 |
| 20 | 12 |
| 21 | 12 |
| 22 | 11 |
| 23 | 11 |
| 24 | 10 |
| 25 | 10 |
| 26 | 9 |
| 27 | 9 |
| 28 | 9 |
| 29 | 8 |
| 30 | 8 |
| 31 | 8 |

Small Table

| span | | |
|---|---|---|
| $b_{m(low)}$ | $b_{m(high)}$ | $\hat{b}_{m(span)}^{-1}$ |
| 32 | 39 | 6 |
| 40 | 47 | 5 |
| 48 | 55 | 4 |
| 56 | 63 | 4 |
| 64 | 71 | 3 |
| 72 | 79 | 3 |
| 80 | 87 | 2 |
| 88 | 95 | 2 |
| 96 | 103 | 2 |
| 104 | 111 | 2 |
| 112 | 119 | 2 |
| 120 | 127 | 2 |
| 128 | 135 | 1 |
| 136 | 143 | 1 |
| 144 | 151 | 1 |
| 152 | 159 | 1 |
| 160 | 167 | 1 |
| 168 | 175 | 1 |
| 176 | 183 | 1 |
| 184 | 191 | 1 |
| 192 | 199 | 1 |
| 200 | 207 | 1 |
| 208 | 215 | 1 |
| 216 | 223 | 1 |
| 224 | 231 | 1 |
| 232 | 239 | 1 |
| 240 | 247 | 1 |
| 248 | 255 | 1 |

Big Table

FIG. 4

METHODS AND APPARATUS FOR BINARY DIVISION USING LOOK-UP TABLE

This application claims the benefit of priority of U.S. Provisional patent application Ser. No. 60/303,559, entitled FAST UNSIGNED CHAR DIVIDE METHODS AND APPARATUS, filed Jul. 6, 2001, the teachings of which are incorporated herein by reference.

BACKGROUND OF THE INVENTION

The present invention pertains to digital data processing, and more particularly to high-speed scalar and vector unsigned binary division. The invention has application (by way of non-limiting example) in real-time software applications, scientific programming, sensor array processing, graphics and image processing, signal processing, and other highly compute-intensive and performance critical activities for a variety of applications.

Division, of course, is a fundamental operation on any computer, though design choices that are reasonable for general purpose division are unsuitable for highly compute-intensive applications, e.g., certain real-time software and/or scientific applications, sensor array processing, graphics and image processing, and signal processing. The processing needed for real-time manipulation and interpretation of medical imaging, by way of example, so overloads the computational capacity of conventional systems processors that required performance parameters sometimes cannot be met.

Vector processors are a class of computational devices that permit operations, such as multiplication and addition, to be simultaneously executed on multiple items of data. The complexity of division is such typical vector processors do not provide a divide operation. Rather, programmers are expected to include in their source code or libraries, algorithms that approximate division, e.g., by Newton-Raphson techniques or otherwise.

Though division can be accomplished at acceptable performance levels on both conventional (scaler) and vector processors, there remains a need for improved digital data processors methods and apparatus for scalar and vector binary division. Such is an object of this invention.

Another object of this invention is to provide methods and apparatus for binary division that operate on existing processors, and that can be ported to future architectures.

A related application is to provide such methods as can be readily implemented at low-cost and without consumption of undue processor or memory resources.

SUMMARY OF THE INVENTION

The foregoing are among the objects attained by the invention which provides, in one aspect, an improved method of operating a digital data processor to perform binary division. The improvement includes estimating reciprocals of at least selected division based on values accessed from a look-up table. A related aspect provides such methods wherein the divisors are used as indices to the look-up table. Further related aspects provide such methods wherein the divisors are bitwise shifted, e.g., right-shifted in order to form such indices.

Further aspects of the invention provide methods as described above including the step of estimating a reciprocal of a divisor that has a value within a first range of values based on a value stored in a first look-up table defined by the divisor. A reciprocal of a division within a second range of values (e.g., that may or may not overlap the first range of values) is estimated as a function of a value stored in a second look-up table at an index that is a bitwise-shifted function of the divisor.

Related aspects of the invention provide such methods wherein a divisor is compared with a threshold value to determine whether to estimate the reciprocal as a function of a value stored in the first table or the second table.

Further related aspects provide such methods wherein the first table comprises estimates for each respective integer divisor in the first range, while the second table comprises estimates for respective groups of integers divisors in the second range. Each of the aforementioned groups, according to related aspect of the invention, has $2^x$ divisors. The steps of estimating reciprocals for divisors in the second range, correspondingly, includes right-shifting (or otherwise bitwise shifting) each divisor x bits prior to using it as index into the second table.

Still further aspects of the invention provide methods as described above including generating a first quotient estimate as functions of reciprocal estimates obtained from the look-up table(s) and of the original dividends. Further quotient estimates are generated, according to related aspects of the invention, by incrementing the initial quotient estimates, e.g., by one or two, depending on the size of any error in the initial reciprocal estimates.

Related aspects of the invention provide methods utilizing steps like those described above of operating a vector processing digital data processor to estimate a plurality of quotients by integer binary division, e.g., with performance under one clock cycle per dividend/divisor pair.

These and other aspects of the invention are evident in the drawings and in the detailed description that follows.

BRIEF DESCRIPTION OF THE ILLUSTRATED EMBODIMENT

A more complete understanding of the invention may be attained by reference to the drawings, in which:

FIG. 4 depicts "big" and "small" look-up tables in a digital data processor according to the invention;

DETAILED DESCRIPTION OF THE ILLUSTRATED EMBODIMENT

Figure 1:
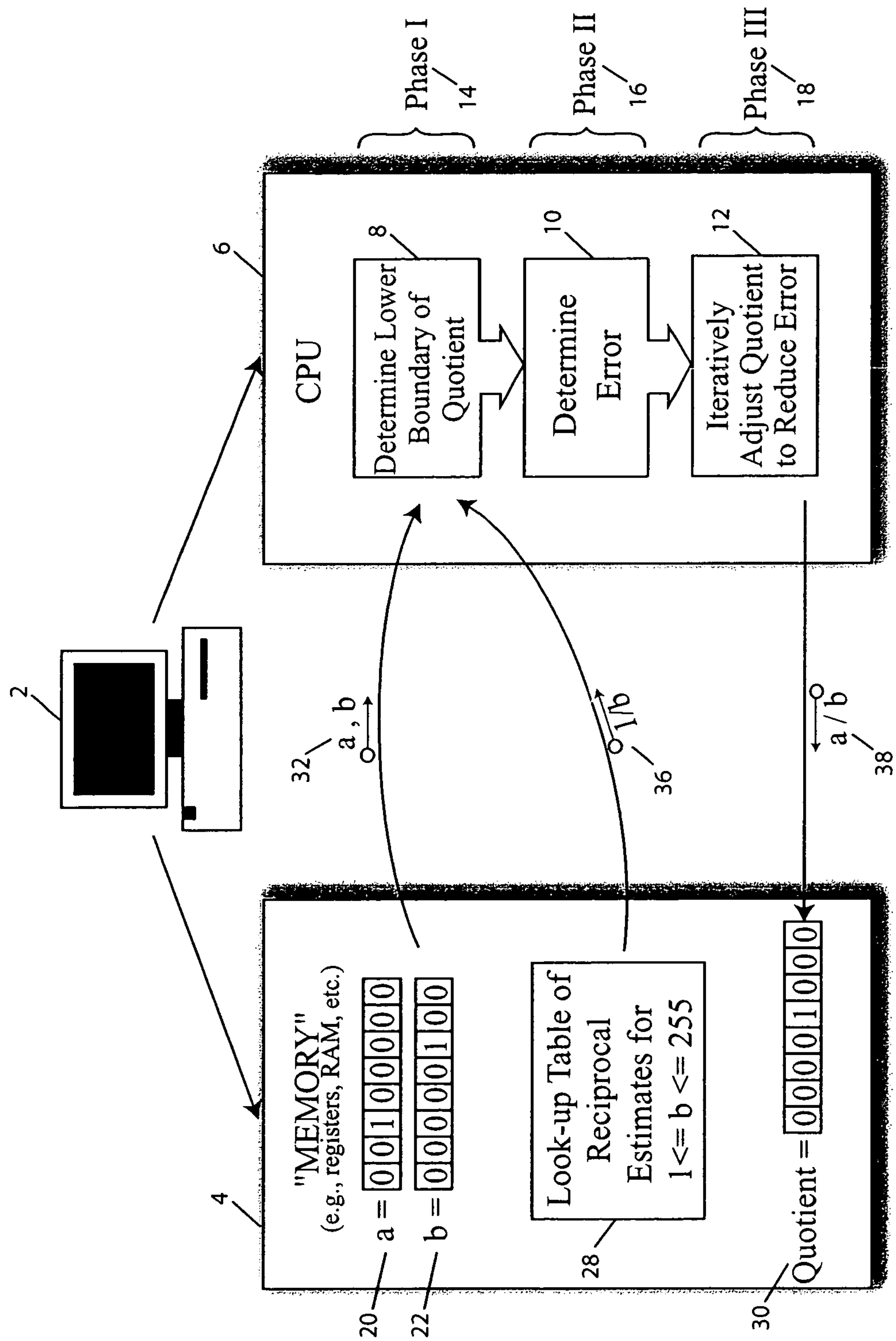
FIG. 1 illustrates functional aspects of a digital data processor configured to perform binary division according to the invention.

FIG. 1 depicts a digital data processor 2 according to the invention configured to perform binary division. The digital data processor 2 may be any of a mainframe, workstation, personal computer, embedded computer or any other digital data processing device known in the art. It includes a memory 4, a CPU 6 and an input/output unit (not shown), coupled as indicated or otherwise in a conventional manner known to the art, though other components can be used in addition or instead.

Illustrated CPU 6 represents a microprocessor, coprocessor, field programmable gate array (FPGA), application specific integrated circuit (ASIC) or other general—or specific—purpose processing unit (or combination thereof), programmable or otherwise, e.g., of the type conventionally used in the aforementioned digital data processor devices.

While it can otherwise be configured and operated in the conventional manner, e.g., for image analysis, signal analysis or other functions, in the illustrated embodiment CPU 6 is programmed or otherwise operated in accord with the teachings hereof to perform binary division.

Illustrated memory 4 represents any register, memory (e.g., RAM, DRAM, ROM, EEPROM), storage device, or combination thereof, of the type conventionally used in the aforementioned below. In the drawing, the memory 4 stores a dividend 20 and divisor 22, each of which is an eight-bit binary number, e.g., an unsigned character or byte. Those skilled in the art will, of course, appreciate that the teachings hereof can be applied to division of values with greater or less bit length and, indeed, of dividends and divisors of dissimilar length (e.g., by zero-padding or otherwise). The memory 4 additionally stores a look-up table 28 of reciprocal estimates and, ultimately, a quotient 22 generated by CPU 6 in the manner discussed herein.

By way of overview, according to one practice of the invention, illustrated CPU 6 determines the quotient 22 in three phases. In phase 1 the CPU determines an initial quotient estimate and more particularly, for example, a lower boundary thereof, by accessing the divisor's reciprocal estimate in look-up table 28 and multiplying the dividend by that estimate. In phase II, it determines the error 10, if any, in the initial quotient estimate. And, in phase III the CPU adjusts the quotient estimate to reduce that error 10.

Figure 2:
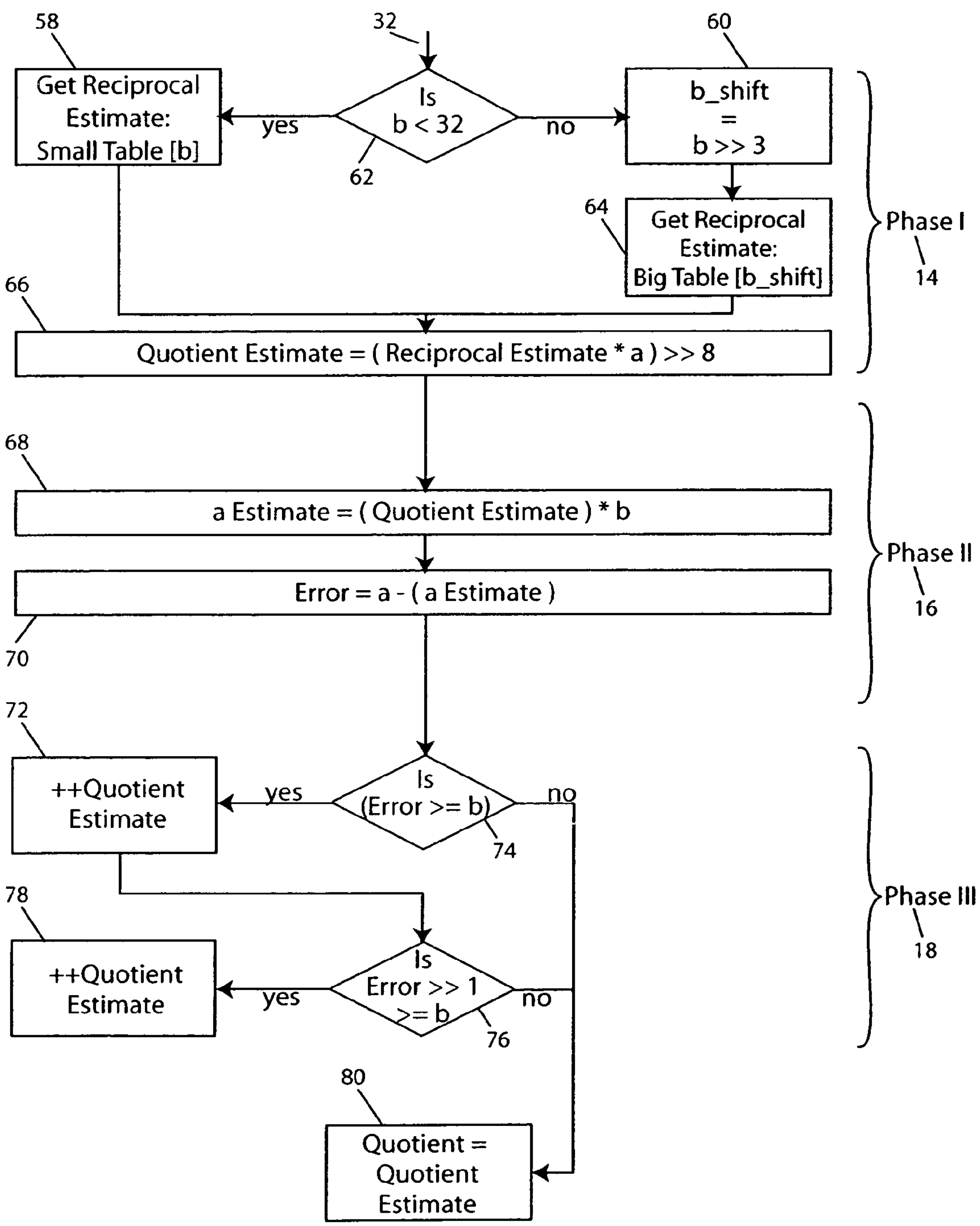
FIG. 2 illustrates a flow chart of binary division according to the invention.

FIG. 2 is a flow chart of this three-phase methodology for binary division. In the drawings, binary dividend and divisor are treated as inputs and denoted 'a' and 'b,' respectively, each having a length n, here, eight bits. Like the quotients generated by the illustrated embodiment, a and b are unsigned integers. While they may represent dividends and divisors that were initially themselves unsigned integers, they more typically represent dividends and divisors that were initially real numbers (or some other underlying form, e.g., signed integers). In this latter case(es), the dividend and divisors are converted to binary integer form, e.g., prior to exercise of the operations described herein, so that they fall between 0 and $2^n-1$ (here, 255). Subsequent to the exercise of those operations, quotient estimates generated by the methods herein are reconverted back to real (or other underlying form), as necessary. These conversions and reconversions are performed in a manner conventional of the art.

In phase I, the CPU 6 compares the divisor b to a threshold value between zero and $2^n-1$. Here, the threshold is 32, though in other embodiments it may take on other values. If the divisor is less than the threshold, the CPU 6 obtains a $b^{th}$ reciprocal estimate from a so-called "small" portion of the look-up table 28; see step 58. Otherwise, in step 64, the CPU obtains a b_shift$^{th}$ reciprocal estimate within a so-called "big" portion of look-up table 28, where b_shift is equal to b bitwise-shifted (here, to the right) by x bits (here, three bits) to eliminate the x least significant bits; see, step 60. The CPU 6, in step 66, multiplies the dividend by the reciprocal estimate and right-shifts the result by the length of the inputs (here, n=8 bits), eliminating the least significant b is of the product and returning a quotient estimate with the same length as the inputs.

In the preceding paragraph and, more generally, throughout this discussion, right-shifting is employed for the purpose of eliminating one or more least significant bits (LSBs) of a value. Those skilled in the art will appreciate that the direction of such shifting is platform-dependent and that, in other embodiments (namely, those implemeneted on platforms with the LSB on the left), left-shifting is employed for that purpose. With this understanding and for the sake of simplicity, the applicants refer to bitwise shifting that eliminates LSBs as "right" shifting (regardless of whether the actual direction is right or left).

In Phase II of the illustrated example, the CPU 6 determines an error of the initial quotient estimate. CPU 6, in step 68, multiplies the divisor by the quotient estimate to determine a dividend estimate. The error is determined in step 70 as the difference of the dividend and its estimate. Those skilled in the art will appreciate other ways to determine the error, all within the invention.

Phase III includes steps 74–78, in which the CPU 6 corrects the quotient based on the size of the error. In the illustrated example, the CPU 6 increments the quotient estimate by one (step 72) if the error is greater than or equal to the divisor. In step 76, the CPU 6 increments the quotient again if the error right-shifted one bit is greater than or equal to the divisor. In step 80, the CPU returns the final quotient estimate in memory 4.

Although described above with regard to certain steps and phases, and connections therebetween, it will be appreciated by those skilled in the art that other modifications and alterations thereto are within the scope of the invention. For example, the general structure and method of the illustrated examples can manifest in other contemplated embodiments using different steps and phases, and organization thereof, without departing from the invention.

Look-up Table Design

Referring back to FIG. 1, the CPU 6 references that look-up table 28 for the reciprocal estimate of each divisor b. According to one embodiment, the look-up table 28 maintains a separate reciprocal estimate for every possible divisor. This can be referred to as a "one-to-one representation" and necessitates storing $2^n-1$ values for divisors of length n (e.g., 255 separate values for n=8).

Preferred embodiments use at least a partially "shared representation," with at least some possible divisors sharing a common reciprocal estimate. This has the advantage of reducing the number of values in and, therefore, the size of the table 28. It can also speed up table access (e.g., permitting storage of the entire table in RAM or other fast memory) and, therefore the overall division operation.

By way of example, the look-up table 28 can store reciprocal estimates based on one-to-one representations for smaller-valued divisors (e.g., those with values below a threshold) and based on shared representations for larger-valued divisors (e.g., those with values above that threshold). The threshold value separating these two classes of divisors is selected to strike a balance between table size and error, which are inversely related.

Figure 3:
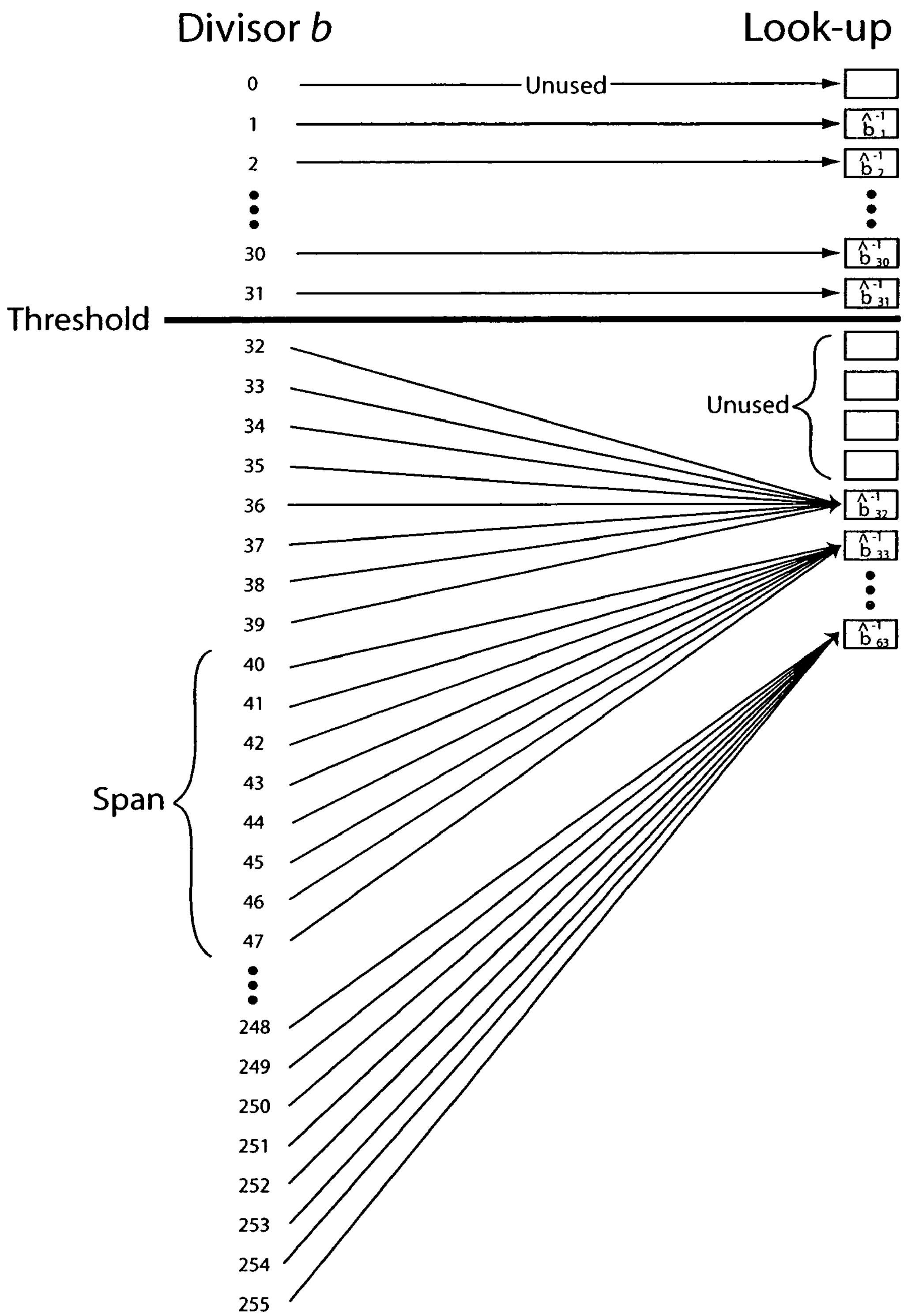
FIG. 3 depicts use of divisors to index look-up tables in a digital data processor according to the invention.

Referring to FIG. 3, the look-up table 28 includes two components: a so-called small table and a so-called bit table (those skilled in the art will appreciate that "small" and "big" are merely labels and may have no reflection on the size of, content of or reciprocals contained in the respective labels).

The small table includes a one-to-one representation of reciprocal estimates for a first range of divisors, here, divisors between 1 and a threshold value, here 32. Thus, the table stores a reciprocal estimate of 255 for the divisor 1, 127 for the divisor 2, 85 for the divisor 3, and so forth, as shown in FIG. 4. In the illustrated embodiment, each such estimate $b_m^{-1}$ is generated, e.g., prior to run-time or, in any event, prior to utilization of the binary division methodology described herein, in accord with the relation $$b_m^{-1}=1/b_m$$

where, $b_m$ is a divisor, and $ƀ_m^{-1}$ is the reciprocal estimate for that divisor The values $ƀ_m^{-1}$ are converted into and stored as binary integers (e.g., using appropriate scaling) so as to represent values between 0 and 255. No reciprocal is provided for divisor b=0, though a value of "undefined" is used in some embodiments.

The big table includes a shared representation of reciprocal estimates for a second range of divisors, here, divisors from the threshold value 32 to the maximum possible divisor (here, 255, given divisors represented by n=8 bits). In the illustrated embodiment, a common reciprocal estimate is provided for each successive group (or span) of possible divisors in the second range, with each span covering $2^x$ divisors. X can have, for example, a value of three, in which case the big table stores a first reciprocal estimate for the first edge (i.e., $2^{3rd}$) divisors is the second group; a second reciprocal estimate for the next eight divisors is the second group; a third reciprocal estimate for the third eight divisors (again, $2^{3rd}$) is the second group; and so forth.

In the illustrated embodiment, the big table stores reciprocal estimates having the values indicated in FIG. 4. For example, it stores a reciprocal estimate of 6 for divisors in the span between 32 and 39, a second reciprocal estimate of 5 for divisors between 40 and 47, and so forth, as shown in the drawing.

In the illustrated embodiment, each such estimate $ƀ^{m(span)-1}$ is generated, e.g., prior to run-time or, in any event, prior to utilization of the binary division methodology described herein, in accord with the relations $$ƀ_{m(span)}^{-1}=1/b_{m(high)}$$

where, $b_{m(high)}$ is the largest divisor in the span $b_{m(low)}$ to $b_{m(high)}$, and $ƀ_{m(span)}^{-1}$ is the reciprocal estimate for that divisor The values $ƀ_{m(span)}^{-1}$ are converted into and stored as binary integers (e.g., using appropriate scaling) as above.

As an alternative to defining $ƀ_{m(span)}^{-1}$ as a function of largest divisor ($b_{m(high)}$) for each respective span, the smallest divisor ($b_{m(low)}$) may be used instead. Alternatively, an average of the largest and smallest divisors in the group—or some other function of those (or other) values in the group—may be used. Those skilled in the art will appreciate defining $ƀ_{m(span)}^{-1}$ in accord with such alternatives may necessitate corresponding modification of the error adjustment in Phase III (e.g., by use of decrementing instead of incrementing, and so forth).

Those skilled in the art will recognize that the spans are not limited to eight divisors, but rather, can range from two to the entirety of divisors beyond the threshold (i.e., integer x between 1 and n). In this regard, it will be appreciated that a shared representation with a smaller span yields more accurate reciprocal estimates at the cost of increasing the length and storage requirements of the big table.

Accessing the Look-Up Table

Referring back to FIG. 3, the reciprocal estimates of the small table are referenced by the CPU 6, for example, using the corresponding divisor as an index. This is indicated in the drawing by horizontal arrows running from divisors 1–31 to table values $ƀ_1^{-1}$ and $ƀ_{31}^{-1}$ In the illustrated embodiment, the CPU 6 references reciprocal estimates in the big table for divisors beyond the threshold using the divisor right-shifted x bits (here, three bits) in order to obtain the reciprocal estimate for that divisor so long, of course, that it is beyond the threshold. This is indicated in the drawing by angled arrows running from divisors 32–255 to table values $ƀ_{32}^{-1}$ and $ƀ_{63}^{-1}$. In this case, leading elements of the big table (e.g., elements with indices 0 through threshold/$2^x$−1) are not used (e.g., since threshold/$2^x$ is the first index generated by such right-shifting). Of course, more or fewer elements can be unused even where right-shifting is employed, e.g., by adding or subtracting an offset to the right-shifted value.

EXAMPLES

Source code in the C programming language for scalar binary division according to one embodiment of the invention is provided below. Consistent with the description above, the source code provides for processing dividends and divisors, a and b, of eight-bit length and returning quotient estimates of that same length. It assumes a threshold of 32 and spans of eight (i.e., x−3). It will be appreciated that other parameters (e.g., for dividend, divisor and quotient length, threshold, span size, and so forth), data types, variables and function calls, and/or programming languages may be used instead in addition consistent with the teachings hereof.

```
#define uchar unsigned char
#define ushort unsided short
uchar big_table{1=(0, 0, 0, 0, 6, 5, 4, 4, 3, 3, 2, 2, 2, 2, 2,
  2, 1, 1, 1, 1, 1, 1, 1, 1, 1, 1, 1, 1, 1, 1, 1, 1};
uchar small_table[ ]−{0, 255, 127, 85, 63, 51, 42, 36, 31, 28,
  25, 23, 21, 19, 18, 17, 15, 15, 14, 13, 12, 12, 11, 11, 10,
  10, 9, 9, 9, 8, 8, 8};
uchar udiv88(uchar a, uchar b)/*divide a/b*/
{
uchar a_est, bshift, diff, recip_est, quot_est, b__1, diff__2;//
  define variables
bshift=b>>3;
//right shift divisor for big table index
recip_est=(b<32)?small_table[b]:big_table[bshift]://if
  b>−thresh, get recip est from big table, else small
quot_est=(recip_est*a)>>8;//quot_est: first byte of product
a_est=quot_est*b;//dividend estimate via quotient estimate
diff=a−a_est;//error
b__1=b−1;
if (diff>b__1)++quot_est;//increment quotient if first error
  check true
diff__2=diff>>1;//right shift error 1 bit
if (diff__2>b__1)++quot_est;//increment quotient if second
  error check true
return (quot_est);//return final quotient
}
```

Binary Division in a Vector Architecture

Further embodiments of the invention provide for application of the forgoing to provide binary division in a vector-processing architecture using vector operations.

Referring back to FIG. 1, a digital data processor 2 can be configured and operated as described above, but with the CPU 6 capable of executing vector operations. Examples include the PowerPC MPC74xx processors by Motorola (e.g., the G4 processor), among others. Such a processor can be programmed, e.g., using the Altivec™ instruction set (see Appendix hereto), in accord with the further examples below to perform binary division on 16-element vectors (each element containing 8-bits) using a three-phase methodology as described above—albeit, where each phase includes concurrently processing the multiple elements in the foregoing and intermediate vectors.

Broadly, according to these embodiments, the CPU divides a vector dividend A by a vector divisor B, resulting in a vector quotient Q. As above, although these vectors can be maintained in any form of memory 4 including conventional RAM, DRAM, ROM, EEPROM, in a preferred embodiment register-type memory is used. Of course, the embodiment is not limited to 16-element vectors (nor each element containing 8-bit) but, rather, can be applied to vectors and elements of other sizes consistent with the teachings hereof.

These small and big tables can be pre-calculated as discussed above and, although these tables can reside in any type of memory 4, each is preferably stored in vectors associated with CPU 6. In the illustrated embodiment, the tables each contain 32-elements and occupy two 16-element vectors a piece.

Generally, as above, in Phase I, the CPU 6 concurrently compares each element of B to a threshold (e.g., between zero and $2^n-1$), assigns it big or small status. It then retrieves 8-bit reciprocal approximations from both tables for the respective elements of B, combining the appropriate approximation (using a mask that is based on the big/small status) into a single reciprocal estimate vector. The CPU multiplies this by the dividend vector A, resulting in a vector having sixteen 16-bit products. For each 16-bit product, the most significant 8-bits are extracted by the CPU 6 into a quotient estimate vector Q, having sixteen 8-bit elements that serve as first estimates of the respective quotients.

In phase II, the CPU 6 multiplies Q by R, resulting in a vector A_estimate with sixteen dividend estimates. The CPU then subtracts A_estimate from the dividend vector A to producer a corresponding error vector of sixteen elements.

In phase III, the CPU compares the error vector to B, and increments each 8-bit element of Q if the corresponding element of error is greater than or equal to that of B. The elements in error are each right shielded 1-bit by the CPU, which compares each element of the shifted error to the corresponding element in B. Again, for those comparisons being greater than or equal, the CPU increments the corresponding 8-bit element of Q. Q is then the final vector of quotient estimates.

A more detailed understanding of vector embodiments of the invention may be attained by reference to the C programming language source code provided below. Parameters passed to the function are three pointers to arrays of sixteen dividends, sixteen divisors, and sixteen quotients, respectively. In the code, which operates on (long) vectors of length N, two sets of vector instructions are used in a loop that processes 32 operands. The loop also includes two scalar instructions, loop count and pointer update. All loop instructions are ordered for parallelism of execution (e.g., two instructions per clock cycle) and overall performance equal to or exceeding sixteen quotients in 15½ clock cycles. Macros at the outset of the code define in C instructions used in the assembly language implementation that follows.

```
#define uchar unsigned char
/*
*define a structure to represent a VMX register
*/
typedef union{
  char c[16];
  uchar uc[16];
  short s[8];
  ushort us[8];
  long l[4];
  ulong ul[4];
  float f[4];
} VMX_reg;
#define LVX(vT, rA, rB)\
  {\
    char*addr; \
    ulong i; \
    addr=(char*)(((ulong)(rA)+(ulong)(rB)) & ~VMX_ADDR_MASK); \
    for (i=0; i<16; i++)\
      (vT).c[C_INDEX_MUNGE(i)]=addr[i]; \
}
#define VSPLTISB (vT, SIMM)\
  {\
    ulong i; \
    for (i=0, i<16; i++)\
      (vT.c[i]=(char)(SIMM); \
}
#define VSRB (vT, vA, vB)\
  {\
    ulong i, sh; \
    for (i=0; i<16; i++) {\
      sh=(vB).uc[i] & 0×7; \
      (vT).uc[i]=(vA).uc[i]>>sh; \
    }\
}
#define VCMPGTUB (vT, vA, vB)\
  {\
    ulong i; \
    for (i=0; i<16; i++)\
      (vT).uc[i]=((vA).uc[i]>(vB).uc[i])?0×ff:0; \
  }
#if defined (LITTLE_ENDIAN)
#define VPERM (vT, vA, vB, vC) VPERM_BE (vT, vB, vA, vC);
#else
#define VPERM (vT, vA, vB, vC) VPERM_BE (vT, vA, vB, vC);
#define VPERM_BE (vT, vA, vB, vC)\
  {\
    VMX_reg v; \
    ulong field, i; \
    for (i=0; i<16; i++) {\
      field=(vC).uc[i]; \
      v.uc[i]=(field<16)!*(vA).uc[field]:(vB).uc
        [field−16]; \
    }\
    for (i=0; i<4; i++)\
      (vT).ul[i]=v.ul(i); \
  }
#define VSEL (vT, vA, vB, vC)\
  {\
    ulong atemp, btemp, i; \
    for (i–0; i<4; i++) {\
      atemp=(vA).ul[i] & ~(vC).ul[i]; \
      btemp=(vB).ul[i] & (vC).ul[i]; \
      (vT).ul[i]=atemp|btemp; \
    }\
  }
#define VMULEUB (vT, vA, vB)\
  {\
    ulong i; \
    ulong a, b, c; \
    for (i=0; i<8; i++) {\
      a=(ulong) (vA).uc[2*i]; \
      b=(ulong) (vB).uc[2*i]; \
      c=a*b; \
      (vT).us[i]=(ushort)c; \
    }\
}
#define VMULOUB (vT, vA, vB)\
```

```
{\
   ulong i; \
   ulong a, b, c; \
   for (i=0; i<8; i++) {\
      a=(ulong) (vA).uc[2*i+1]; \
   b=(ulong) (vB).uc[2*i+1]; \
   c=a*b; \
   (vT).us[i]=(ushort)c; \
   }\
}
#define VSUBUBM (vT, vA, vB)\
{\
   ulong i; \
   for (i=0; i<16; i++)\
      (vT).uc[i]=(vA).uc[i]−(vB).uc[i]; \
}
#if defined (COMPLETE_STVX_CHARS)
#defin STVX (vS, rA, rB)\
{\
   char*addr; \
   ulong i; \
   addr=(char*)(((ulong)(rA)+(ulong)(rB)) & ~VMX_ADDR_MASK); \
   for (i=0; i<16; i++)\
      addr[i]=(vS).c[C_INDEX_MUNGE (i)]; \
}
uchar table[]={0, 0, 0, 0, 6, 5, 4, 4, 3, 3, 2, 2, \\big table
   2, 2, 2, 2, 1, 1, 1, 1, 1, 1, 1, 1,
   1, 1, 1, 1, 1, 1, 1, 1,
   0, 255, 127, 85, 63, 51, 42, 36, 31, / / small table
   28, 25, 23, 21, 19, 18, 17, 15, 15,
   14, 13, 12, 12, 11, 11, 10, 10, 9, 9, 9,
   8, 8, 8,
   0, 16, 2, 18, 4, 20, 6, 22, 8, 24, 10, / / vperm( )
   26, 12, 28, 14, 30,
   1, 17, 3, 19, 5, 21, 7, 23, 9, 25,//index
   11, 27, 13, 29, 15, 31,
   31, 31, 31, 31, 31, 31, 31,//const 31
   31, 31, 31, 31, 31, 31, 31, 31, 31};
/*compute vector c=a/b*/
void vudiv88 (VMX_req*ap, VMX_reg*bp, VMX_reg*c);
{
   VMX_reg big_left, big_right, small_left, small_right;// define variables
   VMX_reg high_bytes, low_bytes, const_1, const_3, const_31;
   VMX_reg events, mask, odds;
   VMX_req quot_est, recip_est, small_est, temp;
   LVX (big_left, 0, table)//load first half of big table
   LVX (big_right, 16, table)//load second bit half of big table
   LVX (small_left, 32, table)//load first half of small table
   LVX (small_right, 48, table)//load second half of small table
   LVX (high_bytes, 64, table)//VPERM( ) indexing
   LVX (low_bytes, 80, table)//VPERM( ) indexing
   LVX (const_31, 96, table)//load constant vector, 31
   VSPLTISB (const_1, 1)//create constant vector, 1
   VSPLTISB (const_3, 3)//create constant vector, 3
   LVX (b_val, 0, bp)//load 16 divisors
   LVX (a_val, 0, ap)//load 16 dividends
   VSRB (b_shift, b_val, const_3)//shift divisors right 3
   VCMPGTUB (mask, b_val, const_31)//0xff if divisor>31: flag small v. big status.
   VPERM (big_est, big_left, big_right, b_shift)//recip est for big divisors
   VPERM (small_est, small_left, small_right, b_val)//recip est for small divisors
   VSEL (recip_est, small_est, big_est, mask)//recip est for all 16 divisors
   VMUILEUB (evens, recip_est, a_val//8 16-bit products (even elements) for quotient est
   VMULOUB (odds, recip_est, a_val)//8 16-bit products (odd elements) for quotient est
   VPERM (quot_est, evens, odds, high_bytes)//first byte of each product into single register
   VMULEUB (evens, quot_est, b_val)//8 16-bit products (even elements) for dividend est
   VMULOUB (odds, quot_est, b_val)//8 16-bit products (odd elements) for dividend est
   VPERM (a_est, evens, odds, low_bytes)//16 dividend est into single register a_est
   VSUBUBM (diff, a_val, a_est)//error if diff=a-a13 est
   VSUBUBM (b__1, v_val, const__1)//b__1=b−1
   VCMPGTUB (mask, diff, b__1)//mask=0xff if (diff>b−1): flag if error check true
   VSUBUBM (quot_est, quot_est, mask)//if (diff>b−1) q++: incr if error check
   VSRB (diff_sh, diff, const__1)//diff_sh=diff/2: right shift error 1-bit for 2nd error check
   VCMPGTUB (mask, diff_sh, b__1)//diff/2>b−1?: flag if 2nd error check true
   VSUBUBM (quot_est, quot_est, mask)//quotient++ if 2nd error check true
   STVX (quot_est, 0, cp)/store quotients
}
```

Provided below is an assembly language source code suitable for compilation and execution on an aforementioned PowerPC processor and corresponding to the C programming language source code above.

```
/* - - -
File Name: UBDIV
Description: Vector Unsigned Char Division
Entyr/params:UBDIV (A, B, C, N)
Formula: C[m]=A[m]/B[m] for m=0 to N−1
ALGORITHM
For 1 A- * B=elem dvd & dvr:
Get 8-bit "reciprocal" dvrcp or dvr:
Use 2 tables for dvr>=0×20 and for dvr<=9×1f;
q16=dvd*dvrcp;//16-bit unit
   cmns=lo byte of q16;
cmns++ up to 2 times if needed;
+ - - - */
LOCAL (_ub_tb1)
START_S_ARRAY (_ub_tb1)
//reciprocals for values ?, ?, ?, ?, 0×20, 0×28, 0×30, . . . /* hi bytes of big reciprs
   */
C_PERMUTE_MASK (0, 0, 0, 0, 6, 5, 4, 4, 3, 3, 2, 2, 2, 2, 2, 2)
//reciprocals for values ? 1, 2, 3, . . . , 31
C_PERMUTE_MASK (0, 0xff, 0x7F, 0x55, 0x3F, ×33, 0x2A, 0x24, \ 0x1F, 0x1C, 0x19, 0x17, 0x15, 0x13, 0x12, 0x11)
C_PERMUTE_MASK (0x0F, 0x0F, 0x0E, 0x0D, 0x0C, 0x0C, 0x0B, 0x0B \ 0x0A, 0x0A, 0x09, 0x09, 0x08, 0x08, 0x08)
//to collect hi bytes
C_PERMUTE_MASK (0×00, 0×10, 0×12, 0×04, 0×14, 0×06, 0×16, \ 0×08, 0×18, 0×0A, 0×1A, 0×0C, 0×1C, 0×0E, 0×1E)
//to collect lo bytes
```

```
C_PERMUTE_MASK (0x01, 0x11, 0x03, 0x13, 0x05,
  0x15, 0x07, 0x17, \ 0x09, 0x19, 0x0B, 0x1B, 0x0D,
  0x1D, 0x0F, 0x1F)
//const 0x1F
C_PERMUTE_MASK (0x1F, 0x1F, 0x1F, 0x1F, 0x1F,
  0x1F, 0x1F, 0x1F, \ 0x1F, 0x1F, 0x1F, 0x1F, 0x1F, 0x1F,
  0x1F, 0x1F)
END_ARRAY
#define FUNC_ROOT _ubdiv_vmx
#define FUND_ENTRY FUNC_ROOT
#define LOAD_A (vT, rA, rB) LVX (vT, rA, rB)
#define LOAD_B (vT, rA, rB) LVX (vT, rA, rB)
#define STORE_C (vT, rA, rB) STVX (vT, rA, rB)
#define A r3
#define B r4
#define C r5
#define N r6
#define ndx1 r7
#define ndx0 r8
#define tptr r9
#define vb__3 v0
#define phibiglft v1
#define phibigrgh v2
#define v_b1 v2
#define phismlift v3
#define phismlrgh v4
#define packhb v5
#define packlb v6
#define vb__0x1f v7/ / const 31
#define dvr0 v8/ / b0. . . bF
#define mskgty0 v8
#define hish0 v9
#define rcpbigh0 v9
#define rcph0 v9
#define qmnshiod0 v9
#define qmns0 v9
#define qpp0 v9
#define c0 v9
#define dvd0 v10
#define diff0 v10
#define diff_sh0 v10
#define bigmsk0 v11
#define qmnshiev0 v11
#define prodev0 v11
#define prod0 v11
#define mskgt0 v11
#define mskgtx0 v11
#define dvrx0 v11
#define rcpsmlh0 r12
#define prodod0 v12
#define dvr1 v13
#define mskgty1 v13
#define qpladj0 v13
#define hish1 v14
#define rcpbigh1 v14
#define rcph1 v14
#define qmnshiod1 v14
#define qmns1 v14
#define qpp1 v14
#define c1 v14
#define dvd1 v15
#define diff1 v15
#define diff_s1 v15
#define bigmsk1 v16
#define qmnshiev1 v16
#define prodev1 v16
#define prod1 v16
#define mskgt1 v16
#define mskgtx1 v16
#define dvrx1 v16
#define rcpsmlh1 v17
#define prodod1 v17
#define dvr__0 v18
#define dvr__1 v19
FUNC_PROLOG
U_ENTRY (FUNC_ENTRY)
  USE_THRU_v19 (VREGSAVE_COND)
  LI (ndx0, 0)
  VSPLTISB(vb__3, 3)//vect of 0x03's for shifts
  LA (tptr, _ub_tb1, 0)//load table address
    //load data from table
  LVX (phibiglft, 0, tptr)
  LI (ndx1, 16)
  VSPLTISB (phibigrgh, 1)//vect of 0x01's
  LVX (phismllft, ndx1, tptr)
  ADDR (tptr, tptr, 32)
    LVX (phismlrgh, 0, tptr)
    LVX (packhb, ndx1, tptr)
  ADDI (tptr, tptr, 32)
  LVX (packlb, 0, tptr)
  LVX (vb__0x1f, ndx1, tptr)
  ADDIC_C (N, N, -4)//N-4
  ADDI (C, C, -32)//predecr C-ptr for loop
  LOAD_A (dvr0, ndx0, B)
  VSRB (hish0, dvr0, vb__3)//shift right dividends
  LOAD_B (dvd0, ndx0, A)
  VCMPGTUB (bigmsk0, dvr0, vb__0x1f)//set ff if
    dvr>=32
  VPER (repbigh0, phibiglft, phibigrgh, hish0)//hi bytes of
    big reciprs
  ADDIC_C (N, N, -16)//N>20?
  VPERM (rcpsmlh0, phismlift, phismlrgh, dvr0)//hi bytes
    of small reciprs
  VSEL (rcph0, rcpsmlh0, rcpbigh0, bigmsk0)
  VMOLEUB (qmnshiev0, dvd0, rcph0)//dvd0*rcp0hi,
    dvd2* . . .
  ADD1 (ndx0, ndx0, 32)//32
  VMULOUB (qmnshiod0, dvd0, rcph0)//dvd1*rcp1hi,
    dvd3* . . .
  VPERM (qmns0, qmnshiev0, qmnshiod0, packhb)//pack
    hi bytes
  BLE (SUFFIX (ubdiv_le__14))//br if N<=20
    //vect len>20
  LOAD_A (dvr1, ndx1, B)
  VMULEUB (prodev0, dvr0, qmns0)//0,prod0, 0,prod2 . .
    .
  LABEL (SUFFIX (loop))
  VMULOUB (prodod0, dvr0, qmns0)//0,prod1, 0,prod3, .
    . .
  VSRB (hish1, drv1, vb__3)
  LOAD_B (dvd1, ndx1, A)
  VCMPGTUB (bigmsk1, drv1, vb__0x1f)
  VSUBUBM (dvr__0, dvr0, v_b1)//dvr-1
  VPERM (prod0, prodev0, prodod0, pack1b)//pack lo
    bytes
  VSUBUBM (diff0, dvd0, prod0)//dividend-product
  VPERM (rcpbigh1, phibiglft, phibigrgh, hish1)
  VCMPGTUB (mskgt0, diff0, dvr__0)//
    difference>=divisors?
VPERM (rcpsmlhl, phismllft, phismlrgh, dvr1)
  VSUBUBM (qpp0, qmns0, mskgt0)//if yes q++
  ADDIC_C (N, N, -16)//N>36?
  VSEL (rcph1, rcpsmlhl, rcpbighl, bigmsk1)
  VMULEUB (qmnshiev1, dvd1, rcph1)
```

```
VMULOUB (qmnshiod1, dvd1, rcph1)
ADDI (ndx1, ndx1, 32)//48
VSRB (diff_sh0, diff0, v_b1)//diff/2
VCMPGTUB (mskgty0, diff_sh0, dvr__0)//diff/2
VPERM (qmns1, qmnshiev1, qmnshiod1, packhb)
BLE (SUFFIX (ubdiv_le__24))//br if N<=36
VSUBUBM (c0, qpp0, msktyl0)//if yes q++
LOAD_A (dvr0, ndx0, B)//2
VMULEUB (prodev1, dvr1, qmns1)
STORE_C (c0, ndx0, C)
LABEL (SUFFIX (mid_loop))
VMULOUB (prodod1, dvr1, qmns1)
VSRB (hish0, dvr0, vb__3)//2
LOAD_B (dvd0, ndx0, A)//2
VCMPGTUB (bigmsk0, dvr0, vf__0x1f)//2
VSUBUBM (dvr__1, dvr1, v_b1)
VPERM (prod1, prodev1, prodod1, pack1b)
VSUBUBM (diff1, dvd1, prod1)
VPERM (repbigh0, phibiglft, phibigrgh, his0)//2
VCMPGTUB (mskgt1, diff1, drv__1)
VPERM (repsmlh0, phismllft, phismlrgh, dvr0)//2
VSUBUBM (qpp1, qmns1, mskgt1)
ADDIC_C (N, N, −16)//N>52?
VSEL (rcph0, rcpsmlh0, rcpbigh0, bigmsk0)//2
VMULEUB (qmnshiev0, dvd0, rcph0)//2
VMULOUB (qmnshiod0, dvd0, rcph0)//2
ADDI (ndx0, ndx0, 32)//64
VSRB (diff_sh1, diff1, v_b1)
VCMPGTUB (mskgtyl, diff_sh1, dvr__1)
VPERM (qmns0, qmnshiev0, qmnshiod0, packhb)//2
BLE (SUFFIX (ubdiv_le__34)//br if N<=52
VSUBUBM (c1, qpp1, mskgty1)
LOAD_A (dvr1, ndx1, B)//3
VMULEUB (prodev0, dvr0, qmns0)//2
STORE_C (c1, ndx1, C)//16 . . . 31
BR (SUFFIX (loop))
LABEL (SUFFIX (ubdiv_le__34))//N<=52
VSUBUBM (c1, qpp1, mskgty1)
VMULEUB (prodev0, dvr0, qmns0)//2
STORE_C (c1, ndx1, C)//16 . . . 31
VMULOUB (prodod0, dvr0, qmns0)//2
VSUBUBM (dvr__0, dvr0, v_b1)//2
VPERM (prod0, prodev0, prodod0, packlb)//2
VSUBUBM (diff0, dvd0, prod0)//2
VCMPGTUB (maskgt0, diff0, dvr__0)//2
VSUBUBM (qpp0, qmns0, mskgt0)
VSRB (diff_sh0, diff0, v_b1)//diff/2
VCMPGTUB (mskgty0, diff_sh0, dvr__0)
VSUBUBM (c0, qpp0, mskgty0)
STORE_C (c0, ndx0, C)
BR (SUFFIX (ret))
LABEL (SUFFIX (ubdiv_le__24))//N<=36
VSUBUBM (c0, qpp0, mskgty0)//if yes q++
VMULEUB (prodev1, dvr1, qmns1)
STORE_C (c0, ndx0, C)
VMULOUB (prodod1, dvr1, qmns1)
VSUBUBM (dvr__1, dvr1, v_b1)
VPERM (prod1, prodev1, prodod1, pack1b)
VSUBUBM (diff1, dvd1, prod1)
VCMPGTUB (mskgt1, diff1, diff1, dvr__1)
VSUBUBM (qpp1, qmns1, mskgt1)
VSRB (diff_sh1, diff1, v_b1)
VCMPGTUB (mskgty1, diff_sh1, dvr__1)
VSUBUBM (c1, qpp1, mskgty1)
STORE_C (c1, ndx1, C)//16. . . 31
BR (SUFFIX (ret))
LABEL (SUFFIX (ubdiv_le__14))//N<=20
    VMULEUB (prodev0, dvr0, qmns0)
    VMULOUB (prodod0, dvr0, qmns0)
    VSUBUBM (dvr__0, dvr0, v_b1)
    VPERM (prod0, prodev0, prodod0, pack1b)//pack lo bytes
    VSUBUBM (diff0, dvd0, prod0)
    VCMPGTUB (mskgt0, diff0, dvr__0)// difference>=divisor?
    VSUBUBM (qpp0, qmns0, mskgt0)//if yes q++
    VSRB (diff_sh0, diff0, v_b1)//diff/2
    VCMPGTUB (mskgty0, diff_sh0, dvr__0)//diff/2>=divisor?
    VSUBUBM (c0, qpp0, mskgty0)//if yes q++
    STORE_C (c0, ndx0, C)
    LABEL (SUFFIX (ret))
    FREE_THRU_v19 (VREGSAVE_COND)
    RETURN
FUNC_EPILOG
```

Described herein are methods and apparatus meeting the above-mentioned objects. It will be appreciated that the embodiments described herein are merely examples of the invention that other embodiments, incorporating modifications to those described herein, fall within the scope of the invention. Therefore, in view of the above, what we claim is:

What is claimed is:

1. In a method of operating a digital data processor to perform binary division, the improvement comprising estimating a reciprocal of a divisor that has a value within a first range of values as a function of a value stored in a first look-up table at an index that is a function of the divisor, the first look-up table comprising estimates for each of respective integer divisors in the first range, and that has a value within a second first range of values as a function of a value stored in a second look-up table at an index that is a function of a bitwise-shifted value of the divisor, the second look-up table comprising estimates for each of respective groups of plural integer divisors in the second range.

2. In the method of claim 1, the further improvement comprising comparing the divisor with a threshold value to determine whether to estimate the reciprocal as a function of a value stored in the first table or the second table.

3. In the method of claim 1, the further improvement wherein at least one of the respective groups has $2^x$ divisors, and the estimating step includes retrieving, for an integer divisor that has a value within the second range, a reciprocal estimate stored in the second look-up table at an index that is a function of a value of the divisor bitwise-shifted by x bits.

4. A method of operating a digital data processor to estimate a quotient of a binary integer dividend by a binary integer divisor, the method comprising the steps of:

A. responding to a divisor that is in a first numeric range of values by accessing a reciprocal estimate from a first look-up table, where such accessing includes using the divisor as an index to the first look-up table, the first look-up table comprising estimates for each of respective integer divisors in the first range, B. responding to a divisor that is in a second numeric range of values by accessing a reciprocal estimate from a second look-up table, where such accessing includes using a bitwise-shifted value of the divisor as an index to the second look-up table, the second look-up table comprising estimates for each of respective groups of plural integer divisors in the second range, C. generating a first quotient estimate as a function of the (i) dividend, and (ii) the reciprocal estimate accessed in steps (A) or (B).

5. In the method of claim 4, the further improvement wherein at least one of the respective groups has $2^x$ divisors.

6. A method of operating a digital data processor to estimate a quotient of a binary integer dividend by a binary integer divisor, the method comprising the steps of:

A. responding to a divisor that is in a first numeric range of values by accessing a reciprocal estimate from a first look-up table, where such accessing includes using the divisor as an index to the first look-up table, B. responding to a divisor that is in a second numeric range of values by accessing a reciprocal estimate from a second look-up table, where such accessing includes using a bitwise-shifted value of the divisor as an index to the second look-up table, C. generating a first quotient estimate as a function of the (i) dividend, and (ii) the reciprocal estimate accessed in steps (A) or (B)

D. generating a further quotient estimate as a function of an error in the first quotient estimate.

7. A method of operating a digital data processor to estimate a quotient of a binary integer dividend by a binary integer divisor, the method comprising the steps of:

A. responding to a divisor that is in a first numeric range of values by accessing a reciprocal estimate from a first look-up table, where such accessing includes using the divisor as an index to the first look-up table, B. responding to a divisor that is in a second numeric range of values by accessing a reciprocal estimate from a second look-up table, where such accessing includes using a bitwise-shifted value of the divisor as an index to the second look-up table, C. generating a first quotient estimate as a function of the (i) dividend, and (ii) the reciprocal estimate accessed in steps (A) or (B)

D. generating a further quotient estimate as a function of an error in the first quotient estimate wherein the step of generating the further quotient estimate includes incrementing the first quotient estimate.

8. A method of operating a digital data processor to estimate a quotient of a binary integer dividend by a binary integer divisor, the method comprising the steps of:

A. responding to a divisor that is in a first numeric range of values by accessing a reciprocal estimate from a first look-up table, where such accessing includes using the divisor as an index to the first look-up table, B. responding to a divisor that is in a second numeric range of values by accessing a reciprocal estimate from a second look-up table, where such accessing includes using a bitwise-shifted value of the divisor as an index to the second look-up table, C. generating a first quotient estimate as a function of the (i) dividend, and (ii) the reciprocal estimate accessed in steps (A) or (B)

D. generating a further quotient estimate as a function of an error in the first quotient estimate wherein the step of generating the further quotient estimate includes twice incrementing the first quotient estimate.

9. A method of operating a vector processor to estimate a plurality of quotients of a plurality of binary integer dividends divided by a plurality of binary integer divisors, the method comprising the steps of:

A. loading a dividend vector with the plurality of binary integer dividends,

B. loading a divisor vector with the plurality of binary integer divisors;

C. generating a reciprocal estimate vector register by i) concurrently comparing each of at least a selected plurality of divisors in the divisor vector to a threshold, ii) accessing a first look-up table to concurrently determine reciprocal estimates for at least divisors in the divisor vector having a first range of values with respect to the threshold, where such accessing includes using each respective divisor as an index to the first look-up table, the first look-up table comprising estimates for each of respective integer divisors in the first range, iii) accessing a second look-up table to concurrently determine reciprocal estimates for at least divisors in the divisor vector having a second range of values with respect to the threshold, where such accessing includes using a bitwise-shifted value of each respective divisor as an index to the second look-up table, the second look-up table comprising estimates for each of respective groups of plural integer divisors in the second range, D. generating concurrently a plurality of first quotient estimates, the generating step including multiplying each of the reciprocal estimates determined in step (C) by a corresponding one of the dividends.

10. In the method of claim 9, the further improvement wherein at least one of the respective groups has $2^x$ divisors.

* * * * *